United States Patent
Ishihara

(10) Patent No.: US 10,752,733 B2
(45) Date of Patent: Aug. 25, 2020

(54) BINDER FOR ELECTROCHEMICAL ELEMENT

(71) Applicant: IDEMITSU KOSAN CO.,LTD., Chiyoda-ku (JP)

(72) Inventor: Yu Ishihara, Sodegaura (JP)

(73) Assignee: IDEMITSU KOSAN CO.,LTD., Chiyoda-ku (JP)

( * ) Notice: Subject to any disclaimer, the term of this patent is extended or adjusted under 35 U.S.C. 154(b) by 0 days.

(21) Appl. No.: 16/091,842

(22) PCT Filed: Apr. 6, 2017

(86) PCT No.: PCT/JP2017/014406
§ 371 (c)(1),
(2) Date: Oct. 5, 2018

(87) PCT Pub. No.: WO2017/175838
PCT Pub. Date: Oct. 12, 2017

(65) Prior Publication Data
US 2019/0085126 A1    Mar. 21, 2019

(30) Foreign Application Priority Data

Apr. 8, 2016 (JP) .................................. 2016-078252

(51) Int. Cl.
| | |
|---|---|
| *H01M 4/62* | (2006.01) |
| *H01B 1/20* | (2006.01) |
| *C08G 69/10* | (2006.01) |
| *H01G 11/38* | (2013.01) |
| *H01M 4/13* | (2010.01) |
| *H01M 2/16* | (2006.01) |
| *C08L 101/02* | (2006.01) |
| *H01G 11/46* | (2013.01) |

(52) U.S. Cl.
CPC ............ *C08G 69/10* (2013.01); *C08L 101/02* (2013.01); *H01G 11/38* (2013.01); *H01G 11/46* (2013.01); *H01M 2/16* (2013.01); *H01M 2/1653* (2013.01); *H01M 4/13* (2013.01); *H01M 4/62* (2013.01); *H01M 4/622* (2013.01); *Y02E 60/122* (2013.01); *Y02E 60/13* (2013.01); *Y02T 10/7011* (2013.01)

(58) Field of Classification Search
CPC .......... H01M 4/62; H01M 4/86; H01M 4/621; H01M 4/622; H01B 1/20
See application file for complete search history.

(56) References Cited

U.S. PATENT DOCUMENTS

| | | | |
|---|---|---|---|
| 2005/0116161 A1* | 6/2005 | Hafeman | ............ B01L 3/50255 |
| | | | 250/282 |
| 2011/0305951 A1 | 12/2011 | Hirano et al. | |
| 2012/0064407 A1* | 3/2012 | Muthu | .................. H01M 4/485 |
| | | | 429/217 |
| 2012/0070713 A1* | 3/2012 | Whear | .................... C08L 89/00 |
| | | | 429/143 |
| 2013/0273423 A1 | 10/2013 | Jeong et al. | |
| 2014/0220438 A1* | 8/2014 | Abe | ...................... H01M 4/137 |
| | | | 429/213 |
| 2015/0017533 A1* | 1/2015 | Takahashi | .......... C08G 18/3215 |
| | | | 429/217 |
| 2015/0140424 A1 | 5/2015 | Ma et al. | |
| 2015/0209481 A1* | 7/2015 | Nakamura | ............ A61L 31/047 |
| | | | 528/328 |
| 2017/0025671 A1 | 1/2017 | Nakayama et al. | |

FOREIGN PATENT DOCUMENTS

| | | | | |
|---|---|---|---|---|
| EP | 1723855 A1 | * | 11/2006 | ............ A61K 36/48 |
| JP | 2002210307 A | * | 7/2002 | |
| JP | 2010-113870 A | | 5/2010 | |
| JP | 2012-59648 A | | 3/2012 | |
| JP | 2014-78416 A | | 5/2014 | |
| JP | 2014-201599 A | | 10/2014 | |
| JP | 5618775 B2 | | 11/2014 | |
| JP | 2015-138768 A | | 7/2015 | |
| JP | 2015-162384 A | | 9/2015 | |
| JP | 2015-213061 A | | 11/2015 | |
| WO | WO 2010/113991 A1 | | 10/2010 | |

OTHER PUBLICATIONS

Polypeptides. I. The Synthesis and the Molecular Weight of High Molecular Weight Polyglutamic Acids and Esters, Blout et al., Communications to the Editor, , Sep. 5, 1954, 4492-4493 (Year: 1954).*
Comblike Alkyl Esters of Biosynthetic Poly(γ-glutamic acid). 1. Synthesis and Characterization et al., Macromolecules 2001, 34, 7868-7875 (Year: 2001).*
Machine translation of J P2002210307.*
International Search Report dated Jul. 4, 2017 in PCT/JP2017/014406, citing documents AA, AB and AO—AU therein, 2 pages.
English translation of the International Preliminary Report on Patentability and Written Opinion of the International Searching Authority dated Oct. 18, 2018 in PCT/JP2017/014406 filed Apr. 6, 2017, citing documents AA, AB and AO—AU therein, 7 pages.
Extended European Search Report dated Nov. 18, 2019, in Patent Application No. 17779216.5, citing documents AA-AB and AO therein, 8 pages.

* cited by examiner

*Primary Examiner* — Haidung D Nguyen

(74) *Attorney, Agent, or Firm* — Oblon, McClelland, Maier & Neustadt, L.L.P.

(57) ABSTRACT

A binder for an electrochemical element, comprising: a polymer having a carboxyl group and/or a salt thereof, a polymer having an amide group and/or an amide bond; or a polymer having a carboxyl group and/or a salt thereof and an amide group and/or an amide bond.

14 Claims, 1 Drawing Sheet

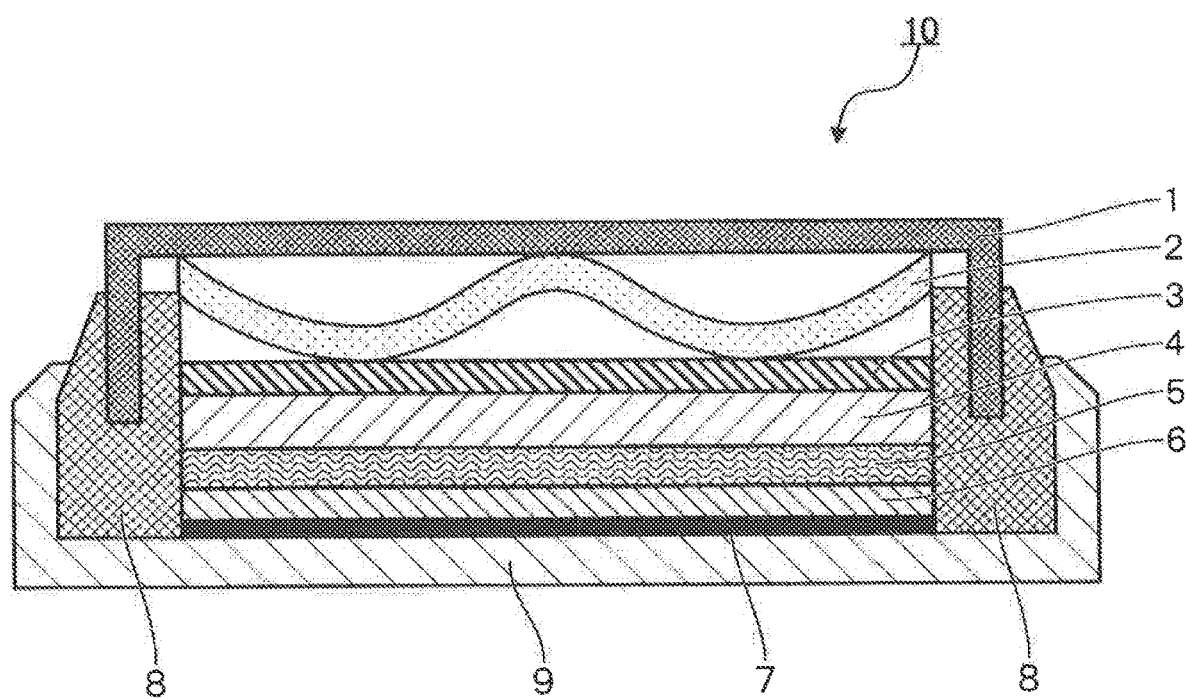

BINDER FOR ELECTROCHEMICAL ELEMENT

TECHNICAL FIELD

The present invention relates to a binder for an electrochemical element.

BACKGROUND ART

A secondary battery is a battery capable of being repeatedly charged and discharged, and use thereof is advancing not only in an electronic device such as a cellular phone and a laptop computer but also in a field of an automobile, aircraft or the like. In response to such a growing demand for the secondary battery, researches have been actively conducted. In particular, a lithium-ion battery that is lightweight, compact and has high energy density among the secondary batteries has attracted attention from each industrial world, and has been enthusiastically developed.

The lithium-ion battery is mainly composed of a positive electrode, an electrolyte, a negative electrode, and a separator. Among the materials, as the electrode, a material prepared by coating an electrode composition on a current collector is used.

Among the electrode compositions, a positive electrode composition used for forming the positive electrode, is mainly, composed of a positive electrode active material, a conductive auxiliary agent, a hinder, and a solvent. As the binder, polyvinylidene fluoride (PVDF), and as the solvent, N-methyl-2-pyrrolidone (NMP) are generally used. The reason is that PVDF is chemically and electrically stabile, and NMP is a solvent which dissolves PVDF and has stability over time.

However, while a low Molecular weight product of PVDF has a problem of insufficient adhesion, if a molecular weight of PVDP is increased, a dissolution concentration is not high, and therefore PVDF having a high molecular weight has a problem of difficulty in increasing a solids content concentration. Moreover, NMP has a high boiling point, and therefore if NMP is used as the solvent, NMP also has a problem of requiring a large quantity of energy for volatilizing the solvent during forming the electrode. In addition thereto, an aqueous material without using an organic solvent has been recently required also for the electrode composition under a background of a growing concern for environmental issues.

In Patent Document 1, an emulsion of polyamideimide and a fluorine resin is used for replacing a solvent during preparing an electrode from NMP to water. The emulsion, however, has room for improvement in dispersibility and stability over time. Moreover, polyamideimide is used as a water-soluble polymer, in which specific examples of a component include an aromatic compound such as 4,4'-diaminodiphenyl ether, and a problem has still remained in resistance to oxidation.

Patent Document 2 discloses that cycle characteristics of a Si-based or alloy-based negative electrode are improved by forming lithium poly-γ-glutamate or the like on a negative electrode as a coating film or incorporating lithium poly-γ-glutamate or the like into the negative electrode as an additive material. Patent Document 2, however, discloses nothing on a function of lithium poly-γ-glutamate or the like as the binder in the negative electrode, in which NMP having a large load on an environment is used also in manufacturing the negative electrode containing lithium polyglutamate.

CITATION LIST

Patent Document

Patent Document 1: Japanese Patent No. 5618775
Patent Document 2: JP 2010113870 A

SUMMARY OF INVENTION

The present invention provides a binder for an electrochemical element, having high resistance to oxidation, a low environmental load, and also a low manufacturing cost.

The present invention provides the binder for the electrochemical element or the like described below.

1. A binder for an electrochemical element, comprising: a polymer having a carboxyl group and/or a salt thereof and a polymer having an amide group and/or an amide bond, or
a polymer having a carboxyl group and/or a salt thereof and an amide group and/or an amide bond.

2. The binder for the electrochemical element according to item 1, further containing water.

3. The binder for the electrochemical element according to item 1 or 2, wherein the polymer having the carboxyl group and/or the salt thereof and the amide group and/or the amide bond is a polymer having 60% or more of a repeating unit represented by the following formula (1) or the following formula (2):

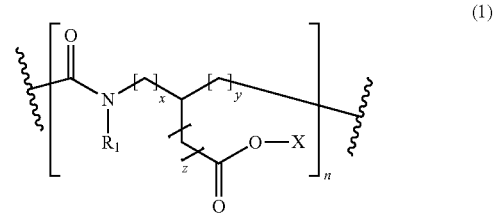

(wherein, in the formula (1), x is an integer of 0 or more and 5 or less, y is an integer of 1 or more and 7 or less, and z is an integer of 0 or more and 5 or less,
X is a hydrogen ion or a metal ion, and
$R_1$ is a hydrogen atom or a functional group having 10 or less carbon atoms);

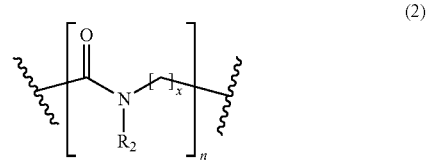

(wherein, in the formula (2), x is an, integer of 1 or more and 12 or less, and
$R_2$ is a functional group containing a carboxyl group or a carboxylate group having 10 or less carbon atoms).

4. The binder for the electrochemical element according to item 3, wherein the metal ion is an alkali metal ion or an alkaline earth metal ion.

5. The binder for the electrochemical element according to item 3 or 4, wherein the metal ion is an alkali metal ion.

6. The binder for the electrochemical element according to any one of items 3 to 5, wherein the metal ion is a Li ion or a Na ion.

7. The binder for the electrochemical element according to any one of items 1 to wherein a part of the carboxyl group is esterified.

8. The binder for the electrochemical element according to any one of items 1 to 7, wherein the polymer having the carboxyl group and/or the salt thereof and the amide group and/or the amide bond is a polymer in which one or more amino acids selected from a neutralized product of glutamic acid and a neutralized product of aspartic acid are amide-bonded, in an $\alpha$-position, a $\beta$-position, or a $\gamma$-position.

9. The binder for the electrochemical element according to any one of items 1 to 8, wherein a repeating unit containing an aromatic hydrocarbon group contained in the polymer is 20% or less.

10. The binder for the electrochemical element according to any one of items 1 to 9, wherein a eight-average molecular weight (Mw, PEG equivalent) of the polymer is 50,000 to 9,000,000.

11. A binder for a lithium-ion battery electrode, containing the binder for the electrochemical element according to any one of items 1 to 10.

12. An electrode composition for a lithium-ion battery, containing the binder for the lithium-ion battery electrode according to item 11.

13. An electrode for a lithium-ion battery, herein the electrode composition for the lithium-ion battery according to item 12 is used.

14. A binder composition for a lithium-ion battery separator, containing the binder for the electrochemical element according to any one of items 1 to 10.

15. A lithium-ion battery separator composition, containing the binder composition for the lithium-ion battery separator according to item 14.

16. A lithium-ion battery separator, wherein the lithium-ion battery separator composition according to item 15 is used.

17. A binder for a lithium-ion battery electrode protective film, containing the binder for the electrochemical element according to any one of items 1 to 10.

18. A composition for a lithium-ion battery electrode protective film, containing the binder for the lithium-ion battery electrode protective film according to item 17.

19. A lithium-ion battery electrode protective film, wherein the composition for the lithium-ion battery electrode protective film according to item 18 is used.

20. A lithium-ion battery, wherein the binder for the electrochemical element according to any one of items 1 to 10 is used.

21. An electrical device, including the lithium-ion battery according to item 20.

22. A vehicle, wherein the lithium-ion battery according to item 20 is provided.

23. A binder for an electric double-layer capacitor, containing the binder for the electrochemical element according to any one of items 1 to 10.

24. A composition for an electric double-layer capacitor electrode, containing the binder for the electric double-layer capacitor according to item 23.

25. An electric double-layer capacitor electrode, wherein the composition for the electric double-layer capacitor electrode according to item 24 is used.

26. An electric double-layer capacitor, including the electric double-layer capacitor electrode according to item 25.

27. An electrical device, wherein the electric double-layer capacitor according to item 26 is used.

26. A vehicle, wherein the electric double-layer capacitor according to item 26 is used.

The present invention can provide the binder for the electrochemical element, having the high resistance to oxidation, the low environmental load, and also the low manufacturing cost.

BRIEF DESCRIPTION OF DRAWINGS

FIG. 1 is a schematic cross-sectional view of a secondary battery of the present invention.

DESCRIPTION OF EMBODIMENTS

Binder for Electrochemical Element

A binder for an electrochemical element according to the present invention contains a polymer having a carboxyl group and/or a salt thereof and a polymer having an amide group and/or an amide bond, or a polymer having a carboxyl group and/or a salt thereof and an amide group and/or an amide bond.

A term "electrochemical element" herein means an element including a secondary battery such as a lithium-ion battery, and a capacitor.

Hereinafter, (1) the polymer having the carboxyl group and/or the salt thereof and the polymer having the amide group and/or the amide bond, and (2) the polymer having the carboxyl group and/or the salt thereof and the amide group and/or the amide bond may be collectively referred to as "the polymer of the present invention".

The binder of the present invention ordinarily contains a solvent, and is preferably a binder containing water as the solvent. A content of water in the solvent is preferably as large as possible, and is preferable in order of 10%, 30%, 50%, 70%, 80%, 90% and 100%, for example. More specifically, a case where the solvent in the binder is only water is most preferable.

The binder of the present invention is an aqueous binder containing a large amount of water, which can minimize the environmental load, and also can reduce a solvent recovery cost.

Specific examples of a solvent which may be contained in the binder and is other than water include an alcohol-based solvent such as ethanol and 2-propanol, acetone, NMP, and ethylene glycol. However, the solvent other than water is not limited thereto.

The polymer of the present invention has a moiety of the carboxyl group and/or the salt thereof in a unit of a repeating structure. The unit having the moiety of the carboxyl group and/or the salt thereof in the polymer is preferably 30% or more of a repeating unit in the polymer, further preferably 50% or more, and particularly preferably 70% or more.

The polymer having the moiety of the carboxyl group and/or the salt thereof has high polarity and can realize satisfactory bindability with metal foil, an active material and a conductive auxiliary agent, and simultaneously has a dispersion function and a thickening function. A composition containing the polymer having the moiety of the carboxyl group and/or the salt thereof as the binder can develop satisfactory applicability.

With regard to the moiety of the carboxyl group and/or the salt thereof of the polymer of the present invention, a degree of neutralization of the carboxyl group in the polymer (carboxylate group moiety/(carboxyl group moiety+carboxylate group moiety)) is preferably 50% or more, further preferably 60% or more, and still further preferably 70% or more.

If the degree of neutralization of the carboxyl group moiety is 50% more, pH is not excessively reduced, and corrosion of the active material and an aluminum current collector can be prevented. Moreover, an improvement in the degree of neutralization causes an improvement of solubility of the polymer into water, and simultaneously reduction of swellability into an electrolytic solution can be expected. The degree of neutralization has no upper limit, but, presence of an excessive base is not preferable.

The degree of neutralization of the carboxyl group moiety described above can be calculated by confirming an element ratio by neutralization titration or elementary analysis (a CHN corder method and ICP atomic emission spectroscopy), for example.

A counterpart of the salt for neutralizing the carboxyl group moiety of the polymer is preferably an alkali metal ion or an alkaline earth metal ion, further preferably an alkali metal ion, and particularly preferably a Na ion or a Li ion.

If a neutralizing counterpart of the salt is Na, the polymer can be manufactured particularly inexpensively, and if the neutralizing counterpart of the salt is Li, the counterpart of the salt can be expected to contribute to reduction of charge transfer resistance between the electrolytic solution and the active material or to an improvement in lithium conductivity within the electrode.

The binder containing the polymer having the moiety of the carboxyl group and/or the salt thereof suppresses an excessive rise of pH. Thus, for example, when the binder is used in a positive electrode composition for the lithium-ion battery, the binder causes an improvement in basicity of the composition when Li complex oxide such as $LiNiO_2$ is further used as a positive electrode active material, and is effective in suppressing corrosion of a current collector (for aluminum or the like) by the improvement in the basicity.

The polymer contained in the binder of the present invention has the amide group and/or the amide bond in the unit of the repeating structure. The unit having a moiety of the amide group and/or the amide bond in the polymer is preferably 30% or more, further preferably 50% or more, and particularly preferably 70% or more of the repeating unit in the polymer.

If the unit having the moiety of the amide group and/or the amide bond is 30% or more an amide group moiety in the polymer forms a hydrogen bond, thereby suppressing dissolution into the electrolytic solution, and simultaneously forming a network by the hydrogen bond, and therefore strongly holding of the active material can be expected.

The polymer of the present invention may be two kinds including the polymer containing the carboxyl group and/or the salt thereof and the polymer containing the amide group and/or the amide bond; or one kind including the polymer having both the carboxyl group and/or the salt thereof and the amide group and/or the amide bond.

In the case of the polymer having both the carboxyl group and the amide bond, the hydrogen bonds are caused in a plurality of points inside and between molecules, and strong binding can be expected, and simultaneously water solubility is improved by an improvement in hydrophilicity, and the swellability into the electrolytic solution can be reduced.

It should be noted that, when the binder contains the polymer having both the carboxyl group and the amide bond, the polymer having both the carboxyl group and the amide bond may be two or more kinds having different structures from each other.

The polymer having the carboxyl group and/or the salt thereof and the amide group and/or the amide bond is preferably a polymer having the amide group moiety and/or the amide bond in a main chain, and having the carboxyl group and/or the carboxylate group moiety in a side chain, and is further preferably a polymer having 60% or more of the repeating unit represented by the following formula (1) or the following formula (2):

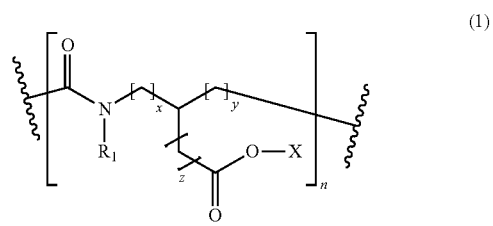

(1)

(wherein, in the formula (x is an integer of 0 or more and 5 or less y is an integer of 1 or more and 7 or less, and z is an integer of 0 or more and 5 or less, X is a hydrogen ion or a metal ion, $R_1$ is, a hydrogen atom or an aliphatic hydrocarbon group having 10 or less carbon atoms, and n is the number of repetition),

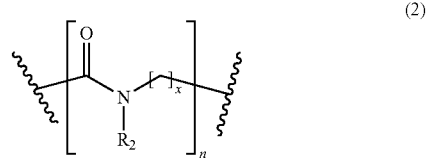

(2)

(wherein, in the formula (2), x is an integer of 1 or more and 12 or less, $R_2$ is an aliphatic hydrocarbon group containing a carboxyl group or a carboxylate group having 10 or less carbon atoms, and n is the number of repetition).

In the above-described formula (1), x is preferably an integer of 0 or more and 3 or less, y is preferably an integer of 1 or more and 4 or less, z is preferably an integer of 0 or more and 3 or less, and x is further preferably an integer of 0 or more and 1 or less, y is further preferably an integer of 1 or more and 2 or less, and z is further preferably an integer of 0 or more and 1 or less.

If a numerical value of x, y and z each is within the above-described range, an aliphatic skeleton can exhibit flexibility, in which the flexibility of the electrode obtained is kept, the aliphatic skeleton, which is a hydrophobic moiety, is sufficiently small relative to the amide, moiety, and the carboxyl group or the carboxylate group moiety, each of which is a hydrophilic moiety, and the solubility in water can be ensured.

X is a hydrogen ion or a metal ion. The metal ion is preferably an alkali metal ion or on alkaline earth metal ion, and is further preferably a Li ion or a Na ion.

Moreover, part of X may be an aliphatic hydrocarbon group, which means that part of X is esterified. A percentage content of an esterified unit structure is preferably 70% or less, further preferably 50% or less, and particularly preferably 30% or less, based on a total. If the percentage content is 70% or less based on the total, the water solubility of the polymer is sufficiently developed. Moreover, specific examples of an ester include a methyl ester and an ethyl ester, in which X is a methyl group or an ethyl group, but are not limited thereto.

$R_1$ is a hydrogen atom or a functional group having 10 or less carbon atoms. The functional group includes an alkyl group, an alkoxyalkyl group, and a hydroxyalkyl group. Specific examples of the functional group having 10 or less carbon atoms include a methyl group, an ethyl group, a straight-chain or branched butyl group, pentyl group, or methoxymethyl group. The number of carbon atoms in the functional group is preferably 10 or less, further preferably 7 or less, and particularly preferably 5 or less. Moreover, $R_1$ may have a functional group forming the hydrogen bond, such as a hydroxyl group in the functional group. If the number of carbon atoms is 10 or less, the solubility in water can be ensured. Moreover, the functional group such as the hydroxyl group improves the water solubility.

In the above-described formula (2), x is preferably an integer of 3 or more and 10 or less, and further preferably an integer of 4 or more and 9 or less. If a numerical value of x is within the above-described range, an aliphatic skeleton can exhibit the flexibility, in which the flexibility of the electrode obtained is kept, and the aliphatic skeleton, which is the hydrophobic moiety, is sufficiently small relative to the amide moiety, and the carboxyl group or the carboxylate group moiety, each of which is the hydrophilic moiety, and the solubility in water can be ensured.

$R_2$ is an aliphatic hydrocarbon group containing a carboxyl group having 10 or less carbon atoms or a carboxylate group having 10 or less carbon atoms. Specific examples of the carboxyl group having 10 or less carbon atoms include a substituent in which a carboxyl group is bonded to an alkyl group having 1 to 9 carbon atoms. Moreover, as a counterpart of a salt of the carboxylate group having 10 or less carbon atoms, a metal ion is preferable, an alkali metal ion or an alkaline earth metal ion is further preferable, and a Li ion or a Na ion is still further preferable. The number of carbon atoms in the functional group is preferably 10 or less, further preferably 7 or less, and particularly preferably 5 or less. If the number of carbon atoms in the functional group is 10 or less, sufficient water solubility can be obtained.

Moreover, part of the carboxyl group may be esterified. A percentage content of an esterified unit structure is preferably 70% or less, further preferably 50% or less, and particularly preferably 30% or less, based on a total. If the percentage content is 70% or less based on the total, the water solubility of the polymer is sufficient developed. Specific examples of an ester include a methyl ester and an ethyl ester, but are not limited thereto.

When the polymer of the present invention is the polymer containing the repeating unit represented by the formula (1) or (2), a proportion of the repeating unit represented by the formula (1) or (2) is preferably 80% or more, and further preferably 90% or more. The proportion of the repeating unit represented by the formula (1) or (2) is most preferably 100%, and all the repeating units of the polymer of the present invention are preferably represented by the formula (1) or (2).

A polymer containing 60% or more of the repeating unit represented by the formula (1) or (2) can provide the electrochemical element with electrochemical stability and physical characteristics preferable for the electrochemical element.

In the polymer of the present invention, the repeating unit containing the aromatic hydrocarbon group is preferably 20% or less, further preferably 15% or less, and particularly preferably 10% or less, based on a total.

Accordingly as an aromatic hydrocarbon group moiety contained in the polymer is smaller, the polymer is further immune from a change of a molecular weight or gas generation by oxidative degradation of the polymer caused by oxidation of the aromatic hydrocarbon group.

The polymer of the present invention is preferably polyamine acid, and further preferably a polymer containing a structure in which one or more amino acids selected from a neutralized product of glutamic acid and a neutralized product of aspartic acid are polymerized in an α-position, a β-position, or a γ-position. The polymers described above are obtained by utilizing a naturally occurring amino acid to have high environmental friendliness. The neutralized product is preferably a neutralized product of a metal ion, further preferably a neutralized product of an alkali metal ion or an alkaline earth metal ion, and still further preferably a neutralized product of a Li ion or a Na ion.

The polymer of the present invention is preferably γ-polyglutamic acid, and further preferably an atactic polymer in which L-form glutamic acid and D-form glutamic acid coexist. The atactic polymer has low crystallinity and high flexibility, and therefore is hard to cause cracking upon being applied as the electrode, and a satisfactory electrode sheet can be established.

A weight-average molecular weight (Mw, PEG equivalent) of the polymer of the present invention is preferably 50,000 or more and 9,000,000 or less, further preferably 80,000 or more and 7,000,000 or less, and still further preferably 100,000 or more and 6000,000 or less.

If the molecular weight of the polymer is 50,000 or more, the polymer becomes hard to be eluted into the electrolytic solution, and binding action by entanglement of molecular chains is obtained, and therefore the bindability can also be expected to be satisfactory. If the molecular weight of the polymer is 9,000,000 or less, solubility of the polymer into water is obtained, and an electrode composition having viscosity at which the composition can be applied thereto can be prepared.

The weight-average molecular weight of the polymer can be measured by gel permeation chromatography. The weight-average molecular weight can be measured, for example, by using two columns of TSKgel GMPWXL made by Tosoh Corporation, 0.2 M $NaNO_3$ aqueous solution as a solvent, and RI-1530 made by JASCO Corporation as a refractive index (RI) detector and in terms of a PEG equivalent determined by drawing a $3^{rd}$ order calibration curve by using TSKgel std PEO made by Tosoh Corporation and PEG made by Agilent Technologies, as standard samples. A sample concentration should be adjusted to about 0.3% by weight (hereinafter, described as wt %).

The polymer of the present invention can also be crosslinked and used upon being used as the binder. Crosslinking includes crosslinking caused by adding a polyvalent metal ion, chemical crosslinking caused by adding a substance having a moiety reacting with a carboxylic acid moiety, such as carbodiimide, and electron beam crosslinking, but is not limited thereto.

The binder of the present invention contains the polymer of the present invention, and a content of the polymer is preferably 10 wt % or more, further preferably 30 wt % or more, and particularly preferably 50 wt % or more. If the content of the polymer is 10 wt % or more, satisfactory bindability of the binder can be expected.

The binder of the present invention may be composed of the polymer of the present invention, and any other component and solvent, or may consist of the polymer of the present invention and the solvent. Any other component means an emulsion, a dispersing agent, any other water-soluble polymer or the like.

The emulsion contained in the binder of the present invention is not particularly limited, and specific examples thereof include a non-fluorine-based polymer such as a (meth)acrylic-based polymer, a nitrile-based polymer, and a diene-based polymer; and a fluorine-based polymer (fluorine-containing polymer) such as PVDF and PTFE (polytetrafluoroethylene). The emulsion is preferably a material having excellent bindability between particles and flexibility (film flexibility). From the viewpoint described above, specific examples thereof include a (meth)acrylic-based polymer, a nitrile-based polymer, and a (meth)acryl-modified fluorine-based polymer.

The dispersing agent contained in the binder of the present invention is not particularly limited, and various dispersing agents including an anionic, nonionic, or cationic surfactant, or a polymer dispersing agent such as a copolymer of styrene and maleic acid (including a half ester copolymer-ammonium salt) can be used.

When the binder contains the dispersing agent, the binder preferably contains the dispersing agent in 5 to 20 wt % based on 100 wt % of the conductive auxiliary agent described later. If a content of the dispersing agent is within such a range, the conductive auxiliary agent can be sufficiently formed into fine particles, and the dispersibility when the active material is mixed therein can be sufficiently ensured.

Specific examples of any other water-soluble polymer contained in the binder of the present invention include polyoxyalkylene, water-soluble cellulose, and polyacrylic acid and a neutralized product thereof.

Then, pH of the binder of the present invention is preferably 4.0 or more, and further preferably 5.0 or more. On the other hand, pH of the binder is preferably not more than 9.0.

Then, pH of the binder can be confirmed by measuring, at 25° C., a 1 wt % aqueous solution of the binder by using a glass electrode type PH Meter TES-1380 (product name, made by CUSTOM Corporation).

The binder of the present invention has a current value of preferably 0.045 mA/mg or less, further preferably 0.03 mA/mg or less, and still further preferably 0.02 mA/mg or less as the current value upon mixing the polymer contained in the binder and the conductive auxiliary agent described later at a mass ratio of 1:1, and being oxidized in the electrolytic solution under 4.8 V vs. Li$^+$/Li. If an oxidation current of the binder at 4.8 V is 0.045 mA/mg or less, degradation in use for a long period of time can be suppressed, even if the binder is used in a material under a high voltage system, and degradation at a high temperature can be suppressed in an ordinary positive electrode composition (layered lithium complex oxide) of 4 V class.

The above-described current value can be measured by the method described in Examples.

Electrode Composition

The binder of the present invention can be preferably used as the binder for the electrode composition with which the electrode for the secondary battery is formed. The binder of the present invention can be used in any of the positive electrode composition containing the positive electrode active material, and a negative electrode composition containing a negative electrode active material, and can be particularly preferably used in the positive electrode composition.

The electrode composition containing the binder of the present invention (hereinafter, may be referred teas the electrode composition of the present invention) contains the active material and the conductive auxiliary agent in addition to the binder.

The conductive auxiliary agent is used for achieving high output of the secondary battery, and specific examples thereof include conductive carbon.

Specific examples of the conductive carbon include carbon black such as Ketjen black and acetylene black; fibrous carbon; and graphite. Among the materials, Ketjen black or acetylene black is preferable. Ketjen black has a hollow shell structure to easily form a conductive network. Therefore, equivalent performance can be developed at an amount of addition at a level about a half in comparison with the conventional carbon black. In acetylene black, impurities by-produced are significantly small by, using a high-purity acetylene gas, and crystallites on the surface are developed, and therefore such acetylene black is preferable.

Carbon black, which is the conductive auxiliary agent, is preferably a material having an average particle size of 1 µm or less. When the electrode composition of the present invention is used and formed into the electrode, the electrode having excellent electric characteristics such as output characteristics can be formed by using the conductive auxiliary agent having the average particle size of 1 µm or less.

The average particle size of the conductive auxiliary agent is further preferably 0.01 to 0.8 µm, and still further preferably 0.03 to 0.5 µm. The average particle size of the conductive auxiliary agent can be measured by a dynamic light scattering particle size analyzer (for example, a refractive index of the conductive auxiliary agent is adjusted to 2.0).

If a carbon nanofiber or a carbon nanotube is used as fibrous carbon, which is the conductive auxiliary agent, a conductive path can be secured, and therefore the output characteristics or cycle characteristics are improved, and therefore such a case is preferable.

Fibrous carbon preferably has a diameter of 0.8 nm or more and 500 nm or less, and a length of 1 µm or more and 100 µm or less. If the diameter is within the range, sufficient strength and dispersibility are obtained, and if the length is within the range, the conductive path by a fiber shape can be secured.

The positive electrode active material is preferably the active material capable of absorbing and desorbing a lithium ion. The positive electrode composition is formed into a preferable material as the positive electrode of the lithium-ion battery by using such a positive electrode active material.

Examples of the positive electrode active material include various oxides and sulfides, and specific examples thereof include manganese dioxide ($MnO_2$), lithium manganese complex oxide ($LiMn_2O_4$ or $LiMnO_2$ for example), lithium nickel complex oxide ($LiNiO_2$ for example), lithium cobalt complex oxide ($LiCoO_2$), lithium nickel cobalt complex oxide ($LiNi_{1-x}Co_xO_2$ for example), lithium-nickel-cobalt-aluminum complex oxide ($LiNi_{0.6}Co_{0.15}Al_{0.05}O_2$), lithium manganese cobalt complex oxide ($LiMn_xCo_{1-x}O_2$ for example), lithium nickel cobalt manganese complex oxide ($LiNi_xMn_yCo_{1-x-y}O_2$), a polyanion-based lithium compound ($LiFePO_4$, $LiCoPO_4F$, and $Li_2MnSiO_4$ for example), vanadium oxide ($V_2O_5$ for example), Li excess-based nickel-cobalt-manganese complex oxide ($Li_xNi_ACo_BMnCO_2$ solid solution for example), a lithium cobalt phosphate compound ($LiCoPO_4$ for example), and lithium nickel manganese complex oxide ($LiNi_{0.5}Mn_{1.5}O_4$ for example), Moreover, specific examples thereof include an organic material such as a conductive polymer material and a disulfide-based polymer material. Specific examples thereof also include a sulfur compound material such as lithium sulfide.

Among the materials, lithium manganese complex oxide ($LiMn_2O_4$), lithium nickel complex oxide ($LiNiO_2$), lithium cobalt complex oxide ($LiCoO_2$), lithium nickel cobalt complex oxide ($LiNi_{0.8}Co_{0.2}O_2$), lithium-nickel-cobalt-aluminum complex oxide ($LiNi_{0.8}Co_{0.15}Al_{0.05}O_2$), lithium manganese cobalt complex oxide ($LiMn_xCo_{1-x}O_2$), lithium nickel cobalt manganese complex oxide ($LiNi_xMn_yCo_{1-x-y}O_2$), Li excess-based nickel-cobalt-manganese complex oxide ($Li_xNi_ACo_BMnCO_2$ solid solution), $LiCoPO_4$, or $LiNi_{0.5}Mn_{1.5}O_4$ is preferable.

From a viewpoint of a battery voltage, the positive electrode active material is preferably Li complex oxide represented by $LiMO_2$, $LiM_2O_4$, $Li_2MO_3$, or $LiMXO_{3\ or\ 4}$. Here, M is composed of one or more transition metal elements selected from Ni, Co, Mn, and Fe in 80% or more, but in addition to the transition metal, Al, Ga, Ge, Sn, Pb, Sb, Bi, Si, P, or B may be added thereto. X is composed of one or more elements selected from P Si, and B in 80% or more.

Among the above-described positive electrode active materials, complex oxide of $LiMO_2$, $LiM_2O_4$, or $Li_2MO_3$ in which M is one or more selected from Ni, Co, and Mn is preferable, and complex oxide of $LiMO_2$ in which M is one or more selected from Ni, Co, and Mn is further preferable, Such Li complex oxide has larger electric capacity (Ah/L) per volume in comparison with a positive electrode material such as a conductive polymer, which is effective in improving energy density.

From a viewpoint of battery capacity, as the positive electrode active material, Li complex oxide represented by $LiMO_2$ is preferable. Here, M preferably contains Ni, further preferably contains Ni in 25% or more of M, and still further preferably contains Ni in 45% or more of M. If M contains Ni, the electric capacity (Ah/kg) per weight of the positive electrode active material increases in comparison with a case where M is Co and Mn, which is effective in improving the energy density.

When the positive electrode active material is. Ni-containing layered lithium complex oxide, a rise of pH by an excessive Li salt or the like is observed in the electrode composition containing the positive electrode active material, and the characteristics inherent to the active material are not obtained by corrosion of the current collector (aluminum or the like) in several cases. On the other hand, the binder of the present invention is used in the electrode composition. Thus, the carboxyl group moiety of the binder polymer suppresses the rise of pH, and corrosion of the current collector of Ni-containing layered lithium complex oxide can be prevented, and the characteristics inherent to the positive electrode active material can be obtained also in the electrode composition.

Moreover, the lithium complex oxide is liable to cause capacity degradation by elution of a metal ion or precipitation in the negative electrode. However, the carboxyl group moiety of the polymer of the present invention captures an eluted metal ion. Thus, it can be expected that the eluted metal ion reaches the negative electrode to prevent occurrence of the capacity degradation.

The positive electrode active material can also be coated with metal oxide, carbon, or the like. Degradation when the positive electrode active material is brought into contact with water can be suppressed by coating the positive electrode active material with metal oxide or carbon, and oxidative decomposition of the binder or the electrolytic solution during charging can be suppressed.

The metal oxide used for coating the material is not particularly limited, and metal oxide such as $Al_2O_3$, $ZrO_2$, $TiO_2$, $SiO_2$, and $AlPO_4$, or a Li-containing compound represented by $Li_\alpha M_\beta O_\gamma$ may be used. It should be noted that, in $Li_\alpha M_\beta O_\gamma$, M is one or more metal elements selected from the group consisting of Al, Ti, Cr, Mn, Fe, Co, Ni, Cu, Zr, Nb, Mo, Ag, Ta, W, and Ir, in which expressions: $0 \leq \alpha \leq 6$, $1 \leq \beta \leq 5$, and $0 < \gamma \leq 12$ hold.

In the positive electrode composition containing the positive electrode active material and the binder of the present invention, a content proportion (weight ratio) of the polymer of the present invention, the positive electrode active material, the conductive auxiliary agent, the emulsion, and any other component other than these components in a solid content of the positive electrode composition preferably satisfies ratios: the polymer of the present invention/the positive electrode active material/the conductive auxiliary agent/the emulsion/any other component=0.2 to 15/70 to 98/2 to 20/0 to 10/0 to 5.

In such a content proportion, the output characteristics or the electric characteristics when the electrode formed of the positive electrode composition is used as the positive electrode of the battery can be made excellent. The content proportion is further preferably 0.5 to 12/80 to 97/1 to 10/0 to 6/0 to 2, and still further preferably 1.0 to 8/85 to 97/15 to 8/0 to 4/0 to 1.5. It should be noted that "any other component" herein means a component other than the polymer of the present invention, the positive electrode active material, the conductive auxiliary agent, and the emulsion, and includes a dispersing agent, a water-soluble polymer other than the polymer of the present invention, or the like.

The positive electrode composition containing the positive electrode active material and the binder of the present invention may consist essentially of the polymer of the present invention, the solvent, the positive electrode active material, and optionally the conductive auxiliary agent and the emulsion. For example, 70 wt % or more, 80 wt % or more, or 90 wt % or more of the positive electrode composition containing the positive electrode active material and the binder of the present invention may be the polymer of the present invention, the solvent, the positive electrode active material, and optionally the conductive auxiliary agent and the emulsion. Moreover, the positive electrode composition may consist of the polymer of the present invention, the solvent, the positive electrode active material, and optionally the conductive auxiliary agent and the emulsion. In this case, the positive electrode composition may contain inevitable impurities.

The positive electrode composition containing the binder of the present invention ensures dispersion stability of the positive electrode active material and a filler component such as the conductive auxiliary agent, and further to be excellent in an ability of forming a coating film and adhesion with a substrate. Then, the positive electrode formed of such a positive electrode composition can develop sufficient performance as the positive electrode for the secondary battery.

When the positive electrode composition is a material containing the binder of the present invention, the positive electrode active material, the conductive auxiliary agent, the emulsion and water, a method for manufacturing the positive electrode aqueous composition is not particularly limited, as long as the positive electrode active material and the conductive auxiliary agent are uniformly dispersed thereinto, and the positive electrode composition can be manufactured by using a bead mill, a ball mill, an agitation type mixer, or the like.

As the negative electrode active material, a carbon material such as graphite, natural graphite, and artificial graphite; a polyacene-based conductive polymer and complex metal oxide such as lithium titanate; or a material ordinarily used in the lithium-ion secondary battery, such as silicon, silicon alloy, silicon complex oxide, and silicon alloy. Among the materials a carbon material, silicon, silicon alloy, or silicon complex oxide is preferable.

In the negative electrode composition containing the negative electrode active material and the binder of the present invention, a content proportion (weight ratio) of the polymer of the present invention, the negative electrode active material, the conductive auxiliary agent, the emulsion, and any other component in a solid content in the negative electrode composition is preferably 0.3 to 15/85 to 99/0 to 10/0 to 9/0 to 5. In such a content proportion, the output characteristics and the electric characteristics when the electrode formed of the negative electrode composition is used as the negative electrode of the battery can be made excellent. The content proportion is further preferably 0.5 to 12/90 to 98.7/0 to 5/0 to 3/0 to 3. The content proportion is still further preferably 1.0 to 8/85 to 98/0 to 4/0 to 2.5/0 to 1.5. It should be noted that "any other component" herein means a component other than the negative electrode active material, the conductive auxiliary agent, the polymer of the present invention, and the binder such as the emulsion and includes the dispersing agent and the thickening agent.

The negative electrode composition containing the negative electrode active material and the binder of the present invention may consist essentially of the polymer of the present invention, the solvent, the negative electrode active material, and optionally the conductive auxiliary agent and the emulsion. For example, 70 wt % or more, 80 wt % or more, or 90 wt % or more of the negative electrode composition containing the negative electrode active material and the binder of the present invention may be the polymer of the present invention, the solvent, the negative electrode active material, and optionally the conductive auxiliary agent and the emulsion. Moreover, the negative electrode composition may consist of the polymer of the present invention, the solvent, the negative electrode active material, and optionally the conductive auxiliary agent and the emulsion. In this case, the negative electrode composition may contain the inevitable impurities.

The negative electrode composition containing the binder of the present invention ensures the dispersion stability of the negative electrode active material, and further to be excellent in the ability of forming the coating film and the adhesion with the substrate. Then, the negative electrode formed of such a negative electrode composition can develop the sufficient performance as the negative electrode for secondary battery.

When the negative electrode composition is a material containing the binder of the present invention, the negative electrode active material, the conductive auxiliary agent, the emulsion and water, a method for manufacturing the negative electrode aqueous composition is not particularly limited, as long as the negative electrode active material and the conductive auxiliary agent are to be uniformly dispersed thereinto, and the negative electrode composition can be manufactured by using the bead mill, the ball mill, the agitation type mixer, or the like.

The electrode composition of the present invention can be formed into the electrode by applying the electrode composition onto the current collector, and then drying the resultant material.

More specifically, when the electrode composition is the positive electrode composition containing the positive electrode active material, the positive electrode composition can be formed into the electrode by applying the positive electrode composition onto a positive electrode current collector, and then drying the resultant material. When the electrode composition is the negative electrode composition containing the negative electrode active material, the negative electrode composition can be formed into the negative electrode by applying the negative electrode composition onto a negative electrode current collector, and then drying the resultant material.

The positive electrode current collector is not particularly limited, as long as a material which has electron conductivity and may conduct current to the positive electrode material held therein is applied thereto. As the positive electrode current collector, for example, a conductive material such as C, Ti, Cr, Mo, Ru, Rh, Ta, W, Os, Ir, Pt, Au, and Al; or an alloy (stainless steel, for example) containing two or more kinds of the conductive materials can be used.

From viewpoints of having high electrical conductivity, and stability in the electrolytic solution, and satisfactory resistance to oxidation, C, Al, stainless steel, or the like is preferable as the positive electrode current collector, and from a viewpoint of a material cost, Al is further preferable.

The negative electrode current collector can be used without particular limitation; as long as the conductive material is applied thereto, and an electrochemically stable material is, preferably used during a battery reaction, and copper, stainless steel or the like can be used, for example.

A shape of the current collector is not particularly limited, and a foil-shaped substrate, a three-dimensional substrate, or the like can be used. Among the materials, if the three-dimensional substrate (a foamed metal, a mesh, a woven fabric, a nonwoven fabric, an expanded material, or the like) is used, even with such an electrode composition containing the binder as lacking adhesion with the current collector, the electrode, having high capacity density is obtained, and high rate charge and discharge characteristics are also improved.

When the current collector is foil-shaped, high capacity can be achieved by preforming a primer layer on a surface of the current collector. The primer layer preferably has satisfactory adhesion between an active material layer and the current collector, and electrical conductivity. For example, the primer layer can be formed by applying, on the current collector, a binder prepared by mixing a carbon-based conductive auxiliary agent therewith at a thickness of 0.1 μm to 50 μm.

The conductive auxiliary agent for the primer layer is preferably carbon powder. If a metal-based conductive auxiliary agent is applied thereto, the capacity density can be increased, but input and output characteristics may be deteriorated. On the other hand, if a carbon-based conductive auxiliary agent is applied thereto, the input and output characteristics can be improved.

Specific examples of the carbon-based conductive auxiliary agent include Ketjen black, acetylene black, a vapor grown carbon fiber, graphite, graphene, and a carbon tube, and may be used alone or in combination with two or more kinds. Among the materials, from viewpoints of conductivity and cost, Ketjen black or acetylene black is preferable.

The binder for the primer layer is not particularly limited, as long as the material can bind the carbon-based conductive auxiliary agent. However, if the primer layer is formed by using the aqueous binder such as PVA, CMC, and sodium alginate in addition to the binder of the present invention, the primer layer may be dissolved upon forming the active material layer, and an effect may be not significantly produced. Therefore, the primer layer should be crosslinked in advance upon using such an aqueous binder. Specific examples of a crosslinking material include a zirconia compound, a boron compound, and a titanium compound, and such a material may be added in 0.1 to 20 wt % based on the amount of binder upon forming slurry for the primer layer.

In the primer layer, the capacity density can be increased by using the aqueous binder in the foil-shaped, current collector, and also polarization is reduced; and the high rate charge and discharge characteristics can be improved, even if charge and discharge are performed with a high current.

It should be noted that the primer layer is effective not only in foil-shaped current collector, but a similar effect is obtained also in the three-dimensional substrate in a similar manner.

Secondary Battery

FIG. 1 is a schematic cross-sectional view showing one embodiment when a positive electrode composition of the present invention is applied as a positive electrode of a lithium-ion secondary battery.

In FIG. 1, a lithium-ion secondary battery 10 is formed by stacking, on a positive electrode can 9, a positive electrode current collector 7, a positive electrode 6, a separator and an electrolytic solution 5, a lithium, metal 4 (negative electrode), and a SUS spacer 3 in this order, in which the stack is fixed with gaskets 8 on both sides in a stacking direction, and with a negative electrode can 1 through a wave washer 2 in the stacking direction.

As the electrolytic solution in the secondary battery, a non-aqueous electrolytic solution, which is a solution prepared by dissolving an electrolyte into an organic solvent, can be used.

Specific examples of the organic solvent include carbonates such as propylene carbonate, ethylene carbonate, butylene carbonate, dimethyl carbonate, diethyl carbonate, and methylethyl carbonate; lactones such as γ-butyrolactone; ethers such, as trimethoxymethane, 1,2-dimethoxyethane, diethyl ether, 2-ethoxyethane, tetrahydrofuran, and 2-methyltetrahydrofuran; sulfoxides such as dimethylsulfoxide; oxolanes such as 1,3-dioxolane, and 4-methyl-1,3-dioxolane; nitrogen-containing solvents such as acetonitrile, nitromethane, and NMP; esters such as methyl formate, methyl acetate, butyl acetate, methyl propionate, ethyl propionate, and phosphotriester; glymes such as diglyme, triglyme and tetraglyme; ketones such as acetone, diethyl ketone, methyl ethyl ketone, and methyl isobutyl ketone; sulfones such as sulfolane; oxazolidinones such as 3-methyl-2-oxazolidinone; and sultones such as 1,3-propane sultone, 4-butane sultone, and naphthasultone. The organic solvents may be used alone or in combination with two or more kinds thereof.

Specific examples of the electrolyte include $LiClO_4$, $LiBF_4$, $LiI$, $LiPF_6$, $LiCF_3SO_3$, $LiCF_3CO_2$, $LiAsF_6$, $LiSbF_6$, $LiAlCl_4$, $LiCl$, $LiBr$, $LiB(C_2H_5)_4$, $LiCH_3SO_3$, $LiC_4F_9SO_3$. $Li(CF_3SO_2)_2N$, and $Li [(CO_2)_2]_2B$.

As the non-aqueous electrolytic solution, a solution prepared by dissolving $LiPF_6$ into carbonates is preferable, and the solution is particularly preferable as the electrolytic solution for the lithium-ion secondary battery.

As the separator for preventing short-circuit of the current by contact between both electrodes of the positive electrode and the negative electrode, or the like, a material capable of reliably preventing the contact between both electrodes, and capable of passing the electrolytic solution therethrough or containing the electrolytic solution therein should be used. For example, a nonwoven fabric made of a synthetic resin of polytetrafluoroethylene, polypropylene, polyethylene or the like, a glass filter, a porous ceramic film, a porous thin film, or the like can be used.

In order to provide the separator with a function such as heat resistance, the separator may be coated with a composition (application liquid) containing the binder of the present invention.

The heat resistance of the separator can be improved by mixing, in addition to the binder of the present invention, ceramic particles of silica, titanium oxide, aluminum oxide, zirconium oxide, magnesium oxide, niobium oxide, barium oxide or the like, and coating the resultant material on the separator.

As a separator substrate in the above-described coat, the above-mentioned material can be used without limitation, and a porous thin film is preferable, and a polyolefin porous film prepared according to a wet process or a dry process can be preferably used.

The above-described composition can be coated on the positive electrode or the negative electrode, and can also be used as a protective film. An improvement in the cycle characteristics of the battery can be expected by forming such a protective film on the positive electrode or the negative electrode.

The secondary battery can be manufactured, for example, by putting the negative electrode, the separator into which the electrolytic solution is impregnated, and the positive electrode in an exterior body and sealing the resultant material. A publicly-known method such as crimping and laminate sealing may be used for sealing.

EXAMPLES

Example 1-1

Acetylene black (HS-100, made by Denka Co., Ltd.) and distilled water were added to a 50 wt % aqueous solution of sodium poly-γ-glutamate (weight-average molecular weight: 230,000, hereinafter, described as "sodium polyglutamate"), and mixed so as to satisfy a ratio: acetylene black sodium polyglutamate=1:1 (weight ratio) to obtain slurry. Hereinafter, unless otherwise specified, a planetary centrifugal mixer (THINKY MIXER) (AWATORIRENTARO) (ARE-310, made by THINKY Corporation) was used upon mixing the materials. The resultant slurry was applied onto aluminum foil, dried at 80° C., and further dried in vacuum, and punched at a diameter of 13 mm into a working electrode.

It should be noted that pH of 1 wt % aqueous solution of sodium polyglutamate was 5.72. As pH of sodium polyglutamate, a 1 wt % aqueous solution thereof was separately prepared, and a value at 25° C. was determined by using a glass electrode type PH meter TES-1380 (product name, made by CUSTOM Corporation).

In an Ar-filled glove box in which an oxygen concentration yeas controlled to be 10 ppm or less and a moisture concentration was controlled to be 5 ppm or less, a gasket was fitted to a positive electrode can of a coin cell (Coin Cell 2032, made by Hohsen Corporation), a positive electrode being the working electrode manufactured and a separator were stacked in this order, and an electrolytic solution was added thereto. Further, a negative electrode, a SUS spacer, a wave washer, and a negative electrode can were stacked, and the resultant material was sealed with a coil cell crimper (made by Hohsen Corporation) to prepare a coin cell. A schematic cross-sectional view of the coin cell obtained is shown in FIG. 1.

It should be noted that each component of the coin cell is as described below: Each component of coin cell Positive electrode: a sheet having a diameter of 13 mm manufactured as described above Separator: a glass separator having a diameter of 16 mm (GA-100, made by Advantech Co., Ltd.)

Negative electrode (counter electrode which functions as a reference electrode): Li foil having a diameter of 15 mm Electrolytic solution: 1 mol/L $LiPF_6$ EC/DEC=3/7 (made by Kishida Chemical Co., Ltd.)

The coin cell manufactured was evaluated by measuring a current value at 4.8 V (based on lithium) under the following conditions and normalizing the current value to a current value per 1 mg of a binder amount on the electrode. The results are shown in Table 1.

Measurement Conditions:

Measuring instrument: ALS model 660E electrochemical analyzer, made by BAS Inc.

Starting potential: spontaneous potential
End potential: 5 V vs. $Li^+/Li$
Sweep speed: 1 mV/sec
Measurement temperature: 25° C.

Example 1-2

Acetylene black (HS-100, made by Denka Co., Ltd.) and distilled water were added to an 18 wt % aqueous solution of lithium poly-γ-glutamate (weight-average molecular weight: 190,000, hereinafter, described as "lithium polyglutamate"), and mixed so as to satisfy a ratio: acetylene black polyglutamate=1:1 (weight ratio) to obtain slurry.

A coin cell was manufactured by using the slurry obtained, and evaluated in the same manner as in Example 1-1. The results are shown in Table 1.

Comparative Example 1

A coin cell was manufactured and evaluated in the same manner as in Example 1-1 except that a solution of N-methyl-2-pyrrolidone (NMP) containing 12 wt % PVDF (weight-average molecular weight: 280,000, homopolymer of vinylidene fluoride) was used in place of the aqueous solution of sodium polyglutamate and NMP was used in place of the distilled water, respectively, to prepare slurry. The results are shown in Table 1.

TABLE 1

|  | Binder | Current value [mA/mg] |
| --- | --- | --- |
| Example 1-1 | Sodium polyglutamate | 0.017 |
| Example 1-2 | Lithium polyglutamate | 0.004 |
| Comparative Example 1 | PVDF | 0.05 |

Table 1 shows that sodium polyglutamate used in Example 1-1 and lithium polyglutamate used in Example 1-2 cause a lower current value than PVDF used in Comparative Example 1, and the coin cell is electrically stable even during applying voltage as high as 4.8 V (based on lithium). The results show that the binder containing sodium polyglutamate or lithium polyglutamate has higher endurance than the binder containing PVDF, and is the binder for the positive electrode for the secondary battery capable of withstanding repeating charge and discharge.

Example 2-1

Water (3.6 parts) and sodium polyglutamate (3.6 parts) were mixed into a homogeneous solution, and then $LiNi_{0.5}Co_{0.2}Mn_{0.3}O_2$ (63 parts) and acetylene black HS-100 (made by Denka Co., Ltd.) (3.4 parts) were added thereto into a mixed dispersion liquid. Water (26 parts) was further added thereto to obtain a positive electrode composition (1).

The positive electrode composition (1) obtained was applied onto 20 μm-thick Al foil by using Micrometer Adjustable Film Applicator (SA-204, made by Tester Industry Co., Ltd.) and Auto Coat Applicator (PI-1210, made by Tester Industry Co., Ltd.), and the resultant material was dried at 80° C. for 10 minutes, and pressed at room temperature to prepare an electrode having a capacity of 1 $mAh/cm^2$ and a porosity of 35%. The electrode obtained was punched into a sheet having a diameter of 13 mm and dried in vacuum at 120° C. for 5 hours.

In an Ar-filled glove box in which an oxygen concentration was controlled to be 10 ppm or less and a moisture concentration was controlled to be 5 ppm or less, a gasket was fitted to a positive electrode can of a coin cell (Coin Cell 2032, made by Hohsen Corporation), a positive electrode being the electrode manufactured and a separator were stacked in this order, and an electrolytic solution was added thereto. Further, a negative electrode, a SUS spacer, a wave washer, and a negative electrode can were stacked, and the resultant material was sealed with a coil cell crimper (made by Hohsen Corporation) to prepare a coin cell. A schematic cross-sectional view of the coin cell obtained is shown in FIG. 1.

It should be noted that each component of the coin cell as described below:
Each Component of Coin Cell Positive electrode: a sheet having a diameter of 13 mm manufactured as described above Separator: a glass separator having, a diameter of 16 mm (GA-100 made by Advantech Co., Ltd.)

Negative electrode (counter electrode which functions as a reference electrode): Li foil having a diameter of 15 mm Electrolytic solution: 1 mol/L $LiPF_6$EC/DEC=3/7 (made by Kishida Chemical Co., Ltd.)

Discharge capacity being charge and discharge characteristics of the coin cell obtained was evaluated under the following measurement conditions. The results are shown in Table 2. It should be noted that irreversible capacity of initial charge and discharge was large under the following conditions in the discharge capacity evaluated, and therefore second cycle discharge capacity was adopted. Moreover, a capacity retention rate was calculated by taking a ratio ($40^{th}$ cycle discharge capacity)/($10^{th}$ cycle discharge capacity) in the following cycle charge and discharge as the capacity retention rate.

It should be noted that battery capacity was calculated on the presumption of 160 mAh per 1 g of $LiNi_{0.5}Co_{0.2}Mn_{0.3}O_2$, and 1 C (a current value completely discharged in one hour) was calculated based on the capacity.

Measurement Conditions

Charge and discharge measuring device: BTS-2004 (made by Nagano Co., Ltd.)

Initial charge and discharge
Charge conditions: 0.1 C-CC·CV Cut-off 4.3 V
Charge end conditions: current value: 0.02 C or less
Discharge conditions: 0.1 C-CC Cut-off 2.0 V
Cycle charge and discharge
Charge conditions: 1 C-CC·CV Cut-off 4.3 V
Charge end conditions: current value: 0.02 C or less
Discharge conditions: 1 C-CC Cut-off 2.0 V The following evaluation was also conducted on the positive electrode composition obtained. The results are shown in Table 2.

Coating Film Uniformity

The coating film obtained upon applying the positive electrode composition onto Al foil was visually observed. A case where lumps, corrosion of aluminum, or the like was unable to be confirmed on the Al foil was evaluated as "good" by deeming such case as formation of a uniform coating film.

Bindability

On electrode foil (20 mm×90 mm) before pressing as obtained by applying the above-described positive electrode composition on the Al foil and drying the resultant material, a cellophane tape (CT-15, made by Nichiban Co., Ltd.) was pasted thereon to be smoothened with a finger ball. Then, the cellophane tape was peeled off at 180° at a rate of 50 mm/min, and two sheets of electrodes each having a diameter of 13 mm were punched before and after being peeled off, respectively, and a retention rate of an electrode stack on the Al current collector was calculated. It should be noted that the retention rate is preferably 50% or more, further preferably 70% or more, and particularly preferably 90% or more, on average. In both Example 2-1 and Example 2-2 described later, a retention rate of 90% or more was achieved, and an improvement of a battery yield or a satisfactory cycle life can be expected by preventing dusting during electrode processing. On the other hand, in Comparative Example 2 described later, the retention rate was significantly lower than 50%, which may lead to reduction of the battery yield or the cycle life.

Example 2-2

$LiNi_{0.5}Co_{0.2}Mn_{0.3}O_2$ (55 parts) and acetylene black HS-100 (made by Denka Co., Ltd.) (3.0 parts) were added to a homogeneous solution (18 wt % solution of lithium polyglutamate) of water (13 parts) and lithium polyglutamate (3.0 parts) into a mixed dispersion liquid. Further, water (26 parts) was added thereto to obtain a positive electrode composition (2).

An electrode and a coin cell were manufactured and evaluated in the same manner as in Example 2-1 except that the positive electrode composition (2) was used in place of the positive electrode composition (1). The results are shown in Table 2.

Comparative Example 2

A homogeneous solution (PVDF 12 wt % NMP solution) of 2.5 parts of PVDF (weight-average molecular weight: 280,000, homopolymer of vinylidene fluoride) and 19 parts of NMP was added to $LiNi_{0.5}Co_{0.2}Mn_{0.3}O_2$ (45 parts) and acetylene black HS-100 (2.5 parts, made by Denka Co., Ltd.), mixed and dispersed. Further, NMP (32 parts) was added thereto and mixed to obtain a positive electrode composition (3).

An electrode and a coin cell were manufactured and evaluated in the same manner as in Example 2-1 except that the positive electrode composition (3) was used in place of the positive electrode composition (1). The results are shown in Table 2.

TABLE 2

| | | Example 2-1 | Example 2-2 | Comparative Example 2 |
|---|---|---|---|---|
| Active material | $LiNi_{0.5}Co_{0.2}Mn_{0.3}O_2$ | 63/90 | 55/90 | 45/90 |
| Conductive auxiliary agent | Acetylene black | 3.4/5 | 3.0/5 | 2.5/5 |
| Binder | Kind of binder | Sodium polyglutamate | Lithium polyglutamate | PVDF |
| | Amount of addition | 3.6/5 | 3.0/5 | 2.5/5 |
| Solvent | Water | 30 | 39 | 0 |
| | NMP | 0 | 0 | 50 |
| Proportion of solid content in positive electrode composition [mass %] | | 70 | 61 | 50 |
| Coating film uniformity | | Good | Good | Good |
| Environmental compliance | | Good | Good | Poor |
| Manufacturing cost | | Good | Good | Poor |
| Bindability [%] | | 100 | 98 | 19 |
| Discharge capacity [mAh/g] | | 170 | 170 | 170 |
| Capacity retention rate [%] | | 94 | 94 | 93 |

In Table 2, items of the active material, the conductive auxiliary agent, and the binder are expressed in terms of a ratio: (content proportion (wt %) in the positive electrode composition)/(content proportion (wt %) in the solid content), respectively. For example, a content proportion of acetylene black in the positive electrode composition in Example 2-1 is 3.4 wt %, and a content proportion of acetylene black in the solid content of the positive electrode composition in Example 2 is 5 wt %.

Moreover, an item of solvent each in Table 2 is expressed in terms of a content proportion (wt %) of the solvent in the positive electrode composition.

Each item in Tables 3 to 5 below has the same meaning as in Table 2.

Table 2 shows that, in the case of the positive electrode composition in which a neutralized product of polyamino acid, such as sodium polyglutamate, was used as the binder, a uniform coating film is obtained even, by using water. Capability of using water as the solvent leads to reduction of an environmental load or reduction of solvent recovery cost, in comparison with the case where an organic solvent was used. Accordingly, environmental compliance in Examples 2-1 and 2-2 was evaluated as "good," and the environmental compliance in Comparative Example 2 was evaluated as "poor."

Moreover, from a viewpoint of solvent cost or the solvent recovery cost in manufacture, a manufacturing cost of the positive electrode composition in Examples 2-1 and 2-2 in which water was used as the solvent was evaluated as "good." In the positive electrode composition in Comparative Example 2 in which NMP was used as the solvent, the manufacturing cost was evaluated as "poor" because of necessity of recovering the organic solvent.

It is found that, with regard to initial discharge capacity, equivalent characteristics are exhibited between Examples 2-1 and 2-2, and Comparative Example 2.

Example 2-3

Water (2.5 parts) and sodium polyglutamate (2.5 parts) were mixed into a homogeneous solution, and then graphite (48 parts) was added thereto into a mixed dispersion liquid. Further, water (47.3 parts) was added thereto to obtain a negative electrode composition.

The negative electrode composition obtained was applied onto 11 μm-thick Cu foil by using Micrometer Adjustable Film Applicator (SA-204, made by Tester Industry Co., Ltd.) and Auto Coat Applicator (PI-1210, made by Tester Industry Co., Ltd.), and the resultant material was dried at 80° C. for 10 minutes, and pressed at room temperature to prepare an electrode having a capacity of 1.1 mAh/cm$^2$ and a porosity of 35%. The electrode obtained was punched into a sheet having a diameter of 14 mm and dried in vacuum at 150° C. for 5 hours.

In an Ar-filled glove box in which an oxygen concentration was controlled to be 10 ppm or less and a moisture concentration was controlled to be 5 ppm or less, a gasket was fitted to a positive electrode can of a coin cell (Coin Cell 2032, made by Hohsen Corporation), a negative electrode being the electrode manufactured and a separator were stacked in this order, and an electrolytic solution was added thereto. Further, a Li metal, a SUS spacer, a wave washer, and a negative electrode can were stacked, and the resultant material was sealed with a coil cell crimper (made by Hohsen Corporation) to prepare a coin cell. A schematic cross-sectional view of the coin cell obtained is shown in FIG. 1.

It should be noted that each component of the coin cell is as described below: Each component of coin cell Negative electrode: a sheet having a diameter of 14 mm manufactured as described above Separator: a glass separator having a diameter of 16 mm (GA-100 made by Advantech Co., Ltd.)

Counter electrode which functions as reference electrode: a Li metal punched into a sheet having a diameter of 15 mm Electrolytic solution: 1 mol/L LiPF$_6$ EC/DEC=3/7 (made by Kishida Chemical Co., Ltd.)

Discharge capacity being charge and discharge characteristics of the coin cell obtained was evaluated under the following measurement conditions.

It should be noted that irreversible capacity of initial charge and discharge was large under the following conditions in the discharge capacity evaluated, and therefore second cycle discharge capacity was adopted. Moreover, a capacity cycle retention rate was calculated by taking a ratio (40$^{th}$ cycle discharge capacity)/(10$^{th}$ cycle discharge capacity) in the following cycle charge and discharge as the capacity cycle retention rate.

It should be noted that battery capacity was calculated on the presumption of 320 mAh per 1 g of graphite, and 1 C (a current value completely discharged in one hour) was calculated based on the capacity.

Measurement Conditions
  Under an atmosphere of 30° C.
  Initial charge and discharge
  Charge conditions: 0.1 C-CC·CV Cut-off 0.01 V
  Charge end conditions: current value: 0.02 C or less
  Discharge conditions: 0.1 C-CC Cut-off 1.0 V
  Cycle charge and discharge
  Charge conditions: 1 C-CC·CV Cut-off 0.01 V
  Charge end conditions: current value: 0.02 C or less
  Discharge conditions: 1 C-CC Cut-off 1.0 V The following evaluation was also conducted on the negative electrode composition obtained. The results are shown in Table 3.

Coating Film Uniformity

The coating film obtained upon applying the Cu foil onto the negative electrode composition was visually observed. A case where lumps, corrosion of aluminum, or the like was unable to be confirmed on the Cu foil was evaluated as "good" by deeming such a case as formation of a uniform coating film.

Comparative Example 2-2

An electrode and a coin cell were manufactured and evaluated in the same manner as in Example 2-3 except that PVDF (weight-average molecular weight: 280,000, homopolymer of vinylidene fluoride) was used as a binder in place of sodium polyglutamate to prepare a negative electrode composition in such a manner that ratios of an active material, the binder, and a solvent were adjusted so as to satisfy values in Table 3. The results are shown in Table 3.

Comparative Example 2-3

An electrode and a coin cell were manufactured and evaluated in the same manner as in Example 2-3 except that PVDF #2 (weight-average molecular weight: 280,000, modified homopolymer of vinylidene fluoride) was used as a binder in place of sodium polyglutamate to prepare a negative electrode composition in such a manner that ratios of an active material, the binder, and a solvent were adjusted so as to satisfy values in Table 3. The results are shown in Table 3.

TABLE 3

| | | Example 2-3 | Comparative Example 2-2 | Comparative Example 2-3 |
|---|---|---|---|---|
| Active material | Graphite | 48/95 | 47/95 | 47/95 |
| Binder | Kind of binder | Sodium polyglutamate | PVDF | PVDF#2 |
| | Amount of addition | 2.5/5 | 2.5/5 | 2.5/5 |
| Solvent | Water | 49.8 | 0.0 | 0.0 |
| | NMP | 0.0 | 50.1 | 50.5 |
| Proportion of solid content in negative electrode composition [mass %] | | 50.2 | 49.9 | 49.5 |
| Coating film uniformity | | Good | Good | Good |
| Environmental compliance | | Good | Poor | Poor |
| Manufacturing cost | | Good | Poor | Poor |
| Discharge capacity [mAh/g] | | 347.9 | 353.9 | 345.9 |
| Capacity retention rate [%] | | 99.4 | 98.4 | 98.7 |

Table 3 shows that the con cell in Example 2-3 in which sodium polyglutamate was used as the binder has a higher capacity retention rate than the coin cells in which PVDF and PVDF #2 each were used.

Examples 2-4

A positive electrode composition was prepared in the same manner as in Example 2-1 except that LiNi$_{0.5}$Mn$_{1.5}$O$_4$ was used as an active material in place of LiNi$_{0.5}$Co$_{0.2}$Mn$_{0.3}$O$_2$, and ratios of the active material, a conductive auxiliary agent, a binder, and a solvent were adjusted so as to satisfy values in Table 4. Separately, a negative electrode composition in Comparative Example 2-2 was also arranged.

The positive electrode composition obtained was applied onto 20 μm-thick Al foil by using Micrometer Adjustable Coat Applicator (SA-204, made by Tester Industry Co., Ltd.) and Auto Film Applicator (PI-1210, made by Tester Industry Co., Ltd.), and the resultant material was dried at 80° C. for 10 minutes, and pressed at room temperature to prepare an electrode having a capacity of 1 mAh/cm$^2$ and a porosity of 35%. The electrode obtained was punched into a sheet having a diameter of 13 mm and dried in vacuum at 150° C. for 5 hours. The resultant material was used as a positive electrode.

The negative electrode composition in Comparative Example 2-2 was applied onto 11 μm-thick Cu foil by using Micrometer Adjustable Film Applicator (SA-204, made by Tester Industry Co., Ltd.) and Auto Coat Applicator (PI-1210, made by Tester Industry Co., Ltd.), and the resultant material was dried at 80° C. for 10 minutes, and pressed at room temperature to prepare an electrode having a capacity of 1 mAh/cm$^2$ and a porosity of 35%. The electrode obtained was punched into a sheet having a diameter of 14 mm and dried in vacuum at 150° C. for 5 hours. The resultant material was used as a negative electrode.

In an Ar-filled glove box in which an oxygen concentration was controlled to be 10 ppm or less and a moisture concentration was controlled to be 5 ppm or less, a gasket was fitted to a positive electrode can of a coin cell (Coin Cell 2032, made by Hohsen Corporation), the positive electrode and a separator were stacked in this order, and an electrolytic solution was added thereto. Further, the negative electrode, a SUS spacer, a wave washer, and a negative electrode can were stacked, and the resultant material was sealed with a coil cell crimper (made by Hohsen Corporation) to prepare a coin cell. A schematic cross-sectional view of the coin cell obtained is shown in FIG. 1.

It should be noted that each component of the coin cell is as described below.

Each Component of Coin Cell

Positive electrode: a sheet having a diameter of as manufactured by using the positive electrode composition in Example 2-4

Separator: a glass separator having a diameter of 16 mm (GA-100, made by Advantech Co., Ltd.)

Negative electrode: a sheet having a diameter of 14 mm as manufactured by using the negative electrode composition in Comparative Example 2-2

Electrolytic solution: 1 mol/L LiPF$_6$EC/DEC=3/7 (made by Kishida Chemical Co., Ltd.)

Discharge capacity being charge and discharge characteristics of the coin cell obtained was evaluated under the following measurement conditions. The results are shown in Table 4. Irreversible capacity of initial charge and discharge was large under the following conditions in the discharge capacity evaluated, and therefore second cycle discharge capacity was adopted. Moreover, a capacity cycle retention rate was calculated by taking a ratio (60$^{th}$ cycle discharge capacity)/(10$^{th}$ cycle discharge capacity) in the following cycle charge and discharge as the capacity cycle retention rate.

It should be noted that battery capacity was calculated on the presumption of 135 mAh per 1 g of LiNi$_{0.5}$Mn$_{1.5}$O$_4$, and 1 C (a current value completely discharged in one hour) was calculated based on the capacity.

Measurement Conditions

Under an atmosphere of 30° C.

Initial charge and discharge

Charge conditions: 0.1 C-CC·CV Cut-off 4.8 V

Charge end conditions: current value: 0.020 or less

Discharge conditions: 0.1 C-CC Cut-off 2.0 V

Repetition: two times

Cycle charge and discharge

Charge conditions: 1 C-CC·CV Cut-off 4.8 V

Charge end conditions: current value: 0.020 or less

Discharge conditions 1 C-CC Cut-off 2.0 V

A cycle test at a high temperature (60° C.) was conducted on a coin cell separately manufactured under the same conditions. A capacity retention rate was calculated by taking a ratio (60$^{th}$ cycle discharge capacity at 1 C)/(10$^{th}$ cycle discharge capacity at 1 C) in the following cycle charge and discharge as a capacity cycle retention rate.

It should be noted that battery capacity was calculated on the presumption of 135 mAh per 1 g of LiNi$_{0.5}$Mn$_{1.5}$O$_4$, and 1 C (current value completely discharged in one hour) was calculated based on the capacity.

Measurement Conditions

High temperature cycle test

Under an atmosphere of 60° C.

Initial charge and discharge

Charge conditions: 0.1 C-CC·CV Cut-off 4.8 V

Charge end conditions: current value: 0.02 C or less

Discharge conditions: 0.1 C-CC Cut-off 2.0 V

Repetition: four times

Cycle charge and discharge

Charge conditions: 1 C-CC·CV Cut-off 4.8 V

Charge end conditions: current value: 0.02 C or less

Discharge conditions: 10-CC Cut-off 2.0 V

The following evaluation was also conducted on the positive electrode composition obtained. The results are shown in Table 4.

Coating Film Uniformity

The coating film obtained upon applying the positive electrode composition onto Al foil was visually observed. A case where lumps, corrosion of aluminum, or the like was unable to be confirmed on the Al foil was evaluated as "good" by deeming such a case as formation of a uniform coating film.

Comparative Example 2-4

A positive electrode composition was prepared, and a coin cell was manufactured and evaluated in the same manner as in Example 2-4 except that PVDF (weight-average molecular weight: 280,000, homopolymer of vinylidene fluoride) was used as a binder in place of sodium polyglutamate, and NMP was used as a solvent in place of water, and ratios of an active material, a conductive auxiliary agent, the binder, and the solvent were adjusted so as to satisfy values in Table 4. The results are shown in Table 4.

TABLE 4

| | | Example 2-4 | Comparative Example 2-4 |
|---|---|---|---|
| Active material | LiNi$_{0.5}$Mn$_{1.5}$O$_4$ | 58/90 | 47/90 |
| Conductive auxiliary agent | Acetylene black | 3.2/5 | 2.6/5 |
| Binder | Kind of binder | Sodium polyglutamate | PVDF |
| | Amount of addition | 3.3/5 | 2.6/5 |
| Solvent | Water | 35.3 | 0.0 |
| | NMP | 0.0 | 48.1 |
| Proportion of solid content in positive electrode composition [mass %] | | 64.7 | 51.9 |
| Coating film uniformity | | Good | Good |
| Environmental compliance | | Good | Poor |
| Manufacturing cost | | Good | Poor |

TABLE 4-continued

|  | Example 2-4 | Comparative Example 2-4 |
|---|---|---|
| Discharge capacity [mAh/g] | 122.3 | 123.4 |
| Capacity retention rate [%] | 96.2 | 94.1 |
| Capacity retention rate at 60° C. [%] | 83.8 | 79.4 |

Table 4 shows that the coin cell in Example 2-4 in which sodium polyglutamate was used as the binder exhibited a higher capacity retention rate than the coin cell prepared in which PVDF was used. Moreover, the coin cell in Example 2-4 exhibited a higher capacity retention rate than the coin cell in which PVDF was used also in the cycle test at a high temperature (60° C.).

Examples 2-5

A positive electrode composition was prepared in the same manner as in Example 2-4 except that $LiFePO_4$ was used as an active material in place of $LiNi_{0.5}Mn_{1.5}O_4$, and ratios of the active material, a conductive auxiliary agent, a binder, and a solvent were adjusted so as to satisfy values in Table 5.

An electrode and a coin cell were produced and evaluated by using the positive electrode composition obtained in the same manner as in Example 2-4. The results are shown in Table 5.

Discharge capacity, being charge and discharge characteristics of the coin cell obtained was evaluated under the following measurement conditions. The results are shown in Table 5. It should be noted that irreversible capacity of initial charge and discharge was large under the following conditions in the discharge capacity evaluated, and therefore second cycle discharge capacity was adopted. Moreover, a capacity cycle retention rate was calculated by taking a ratio ($40^{th}$ cycle discharge capacity)/($10^{th}$ cycle discharge capacity) in the following cycle charge and discharge as the capacity cycle retention rate.

It should be noted that battery capacity was calculated on the presumption of 150 mAh per 1 g of $LiFePO_4$, and 1 C (a current value completely discharged in one hour) was calculated based on the capacity.

Measurement Conditions
  Under an atmosphere of 30° C.
  Initial charge and discharge
  Charge conditions: 0.1 C-CC·CV Cut-off 4.8 V
  Charge end conditions: current value: 0.02 C or less
  Discharge conditions: 0.1 C-CC Cut-off 2.0 V
  Repetition: two times
  Cycle charge and discharge
  Charge conditions: 1 C-CC·CV Cut-off 4.8 V
  Charge end conditions: current value: 0.02 C or less
  Discharge conditions: 1 C-CC Cut-off 2.0 V A cycle test at a high temperature (60° C.) was conducted on a coin cell separately manufactured under the same conditions. A capacity retention rate was calculated by taking a ratio: ($100^{th}$ cycle discharge capacity at 1 C)/($10^{th}$ cycle discharge capacity at 1 C) in the following cycle charge and discharge as a capacity, cycle retention rate.

It should be noted that battery capacity was calculated on the presumption of 150 mAh per 1 g of $LiFePO_4$, and 1 C (a current value completely discharged in one hour) was calculated based on the capacity.

Measurement Conditions
  High temperature cycle test
  Under an atmosphere of 60'C
  Initial charge and discharge
  Charge conditions: 0.1 C-CC Cut-off 3.8 V
  Discharge conditions: 0.1 C-CC Cut-off 2.0 V
  Repetition: two times
  Cycle charge and discharge
  Charge, conditions: 1 C-CC Cut-off 3.8 V
  Discharge conditions: 1 C-CC Cut-off 2.0 V Comparative Example 2-5

A positive electrode composition was prepared, and a coin cell was manufactured and evaluated in the same manner as in Example 2-5 except that PVDF (weight-average molecular weight: 280,000, homopolymer of vinylidene fluoride) was used as a binder in place of sodium polyglutamate and NMP was used as a solvent in place of water, and ratios of an active material, a conductive auxiliary agent, the binder, and the solvent were adjusted so as to satisfy values in Table 5. The results are shown in Table 5.

TABLE 5

|  |  | Example 2-5 | Comparative Example 2-5 |
|---|---|---|---|
| Active material | $LiFePO_4$ | 35/88 | 42/88 |
| Conductive auxiliary agent | Acetylene black | 3.2/8 | 3.9/8 |
| Binder | Kind of binder | Sodium polyglutamate | PVDF |
|  | Amount of addition | 1.6/4 | 1.9/4 |
| Solvent | Water | 60.3 | 0.0 |
|  | NMP | 0.0 | 52.2 |
| Proportion of solid content in positive electrode composition [mass %] |  | 39.7 | 47.8 |
| Coating film uniformity |  | Good | Good |
| Environmental compliance |  | Good | Poor |
| Manufacturing cost |  | Good | Poor |
| Discharge capacity [mAh/g] |  | 124.3 | 129.2 |
| Capacity retention rate [%] |  | 98.3 | 97.5 |
| Capacity retention rate at 60° C. [%] |  | 71.3 | 58.7 |

Table 5 shows that the coin cell in Example 2-5 in which sodium polyglutamate was used as the binder exhibited a higher capacity retention rate than the coin cell in which PVDF was used. Moreover, the coin cell in Example 2-5 exhibited a higher capacity retention rate than the coin cell in which PVDF was used also in the cycle test at a high temperature (60° C.).

Examples 2-6

A coin cell was manufactured in the same manner as in Example 2-1 except that the negative electrode manufactured in Comparative Example 2-3 was used as a negative electrode in place of Li foil.

Discharge capacity being charge and discharge characteristics of the coin cell obtained was evaluated under the following measurement conditions. The results are shown in Table 6. It should be noted that irreversible capacity of initial charge and discharge was large under the following conditions in the discharge capacity evaluated, and therefore second cycle discharge capacity was adopted. Moreover, a capacity cycle retention rate was calculated by taking a ratio ($40^{th}$ cycle discharge capacity)/($10^{th}$ cycle discharge capacity) in the following cycle charge and discharge as the capacity cycle retention rate.

It should be noted that battery capacity was calculated on the presumption of 160 mAh per 1 g of $LiNi_{0.5}Co_{0.2}Mn_{0.3}O_2$, and 1 C (a current value completely discharged in one hour) was calculated based on the capacity.

Measurement Conditions
Under an astrosphere of 30° C.
Initial charge and discharge
Charge conditions: 0.1 C-CC-CV Cut-off 4.3 V
Charge, end conditions: current value: 0.02 C or less
Discharge conditions: 0.1 C-CC Cut-off 2.0 V
Repetition: two times
Cycle charge and discharge
Charge conditions: 1 C-CC·CV Cut-off 4.3 V
Charge end conditions: current value: 0.02 C or less
Discharge conditions: 1 C-CC Cut-off 2.0 V A cycle test at a high voltage was conducted on a coin cell separately manufactured under the same conditions. A capacity retention rate was calculated by taking a ratio ($60^{th}$ cycle discharge capacity at 1 C)/(10th cycle discharge capacity at 1 C) in the following cycle charge and discharge as a capacity cycle retention rate.

It should be noted that battery capacity was calculated on the presumption of 190 mAh per 1 g of $LiNi_{0.5}Co_{0.2}Mn_{0.3}O_2$, and 1 C (a current value completely discharged in one hour) was calculated based on the capacity.

Measurement Conditions
High voltage cycle test
Under an atmosphere of 30° C.
Initial charge and discharge
Charge conditions: 0.1 C-CC Cut-off 4.5 V
Charge end conditions: current value: 0.020 or less
Discharge conditions: 0.1 C-CC Cut-off 2.0 V
Repetition: two times
Cycle charge and discharge
Charge conditions: 1 C-CC Cut-off 4.5 V
Charge end conditions: current value: 0.02 C or less
Discharge conditions: 1 C-CC Cut-off 2.0 V
Repetition: 60 times Comparative Example 2-6

A coin cell was manufactured in the same manner as in Comparative Example 2 except that the negative electrode manufactured in Comparative Example 2-3 was used as a negative electrode in place of Li foil, and the same evaluation as in Example 2-6 was conducted thereon. The results are shown in Table 6.

TABLE 6

|  | Example 2-6 | Comparative Example 2-6 |
|---|---|---|
| 4.3 V, discharge capacity [mAh/g] | 168.7 | 165.2 |
| 4.3 V, capacity retention rate [%] | 97.1 | 94.7 |
| 4.5 V, discharge capacity [mAh/g] | 193.0 | 198.4 |
| 4.5 V, capacity retention rate [%] | 86.8 | 83.4 |
| 4.5 V, average voltage after cycle [V] | 3.6 | 3.3 |

As a result of the evaluation, the coin cell in Example 2-6 in which sodium polyglutamate was used as the binder exhibited a higher capacity retention rate in the cycle at 4.3 V than the coin cell in which PVDF was used. Further, a difference in the capacity retention rate increased in the cycle at 4.5 V, and degradation of an average voltage was also suppressed.

Examples 2-7

The coin cell manufactured in Example 2-6 was charged to 4.3 V, 4.4 V, and 4.5 V under the following conditions, respectively. The charged coin cells were left at each of 60° C. and 80° C. for 96 hours, respectively, and self-discharge amounts after a period of leaving the coin cell were compared. The results are shown in Table 7.

Measurement Conditions
Charge conditions: 0.1 C-CC Cut-off 4.5 V, 4.4 V, and 4.3 V
Charge end conditions: current value: 0.02 C or less
Discharge conditions: 0.1 C-CC Cut-off 2.0 V
Repetition: two times
Charge conditions: 0.1 C-CC Cut-off 4.5 V, 4.4 V, and 4.3 V
Charge end conditions: current value: 0.02 C or less
Left at 60° C. or 80° C. for 96 hours
Discharge conditions: 0.1 C-CC Cut-off 2.0 V
Charge conditions: 0.1 C-CC Cut-off 4.5 V, 4.4 V, and 4:3 V
Charge end conditions: current value: 0.020 or less
Repetition: two times Comparative Example 2-7

The same evaluation as in Example 2-7 was conducted on the coin cell manufactured in Comparative Example 2-6. The results are shown in Table 7.

TABLE 7

|  |  | Example 2-7 | Comparative Example 2-7 |
|---|---|---|---|
| Self-discharge amount | 4.3 V, 60° C. [mAh/g] | 32.7 | 34.7 |
|  | 4.4 V, 60° C. [mAh/g] | 38.0 | 43.1 |
|  | 4.5 V, 60° C. [mAh/g] | 42.6 | 48.9 |
|  | 4.3 V, 80° C. [mAh/g] | 71.4 | 82.1 |
|  | 4.4 V, 80° C. [mAh/g] | 81.4 | 97.3 |

Table 7 shows that the coin cell in Example 2-7 in which sodium polyglutamate was used as the binder has a smaller self-discharge amount and a difference thereof is large particularly at high potential or at a high temperature.

From the above the sodium polyglutamate binder has a possibility of improving endurance of the lithium-ion battery at high potential and a high temperature.

As described above, the present invention has been described by a number of embodiments and Examples, but the present invention is not limited thereto, and numerous modifications can be made within the scope of the spirit of the present invention. The present invention covers a structure (the same structure in functions, methods, and results, or the same structure in objectives and effects) substantially same with the structure described in the embodiment. Moreover, the present invention covers a structure in which a non-essential part described in the embodiment described above is replaced by any other structure. Further, the present invention also covers a structure according to which the same working effect can be produced or the same objective can be achieved as in the structure described in the embodiment described above. Furthermore, the present invention also covers a structure formed by adding a publicly-known technique to the structure described in the embodiment described above.

The entire contents of the description of the Japanese application serving as a basis of claiming the priority concerning the present application to the Paris Convention are incorporated by reference herein.

For example, the Examples have been described by way of the binder for the positive electrode for the lithium-ion secondary battery, but the present invention is not limited thereto. The binder according to the present invention can be preferably used as a binder for any other electrochemical element, such as a binder for a negative electrode for the lithium-ion battery, a binder for a separator coat for the lithium-ion battery, and a binder for an electric double-layer capacitor. In particular, the binder according to the present invention can be preferably used for any other electrical device that is exposed to an oxidation environment, such as a binder for a separator coat or a binder for a capacitor for the lithium-ion battery.

The electrochemical element manufactured by using the binder according to the present invention, such as the lithium-ion battery, and the electric double-layer capacitor, can be used for various electrical devices and vehicles. Specific examples of the electrical device include a cellular phone and a laptop computer, and specific examples of the vehicle include an automobile, a railroad vehicle, and an airplane, but are not limited thereto.

The invention claimed is:

1. An electrode composition comprising a binder and an oxide, wherein the binder comprises, comprising:
    a polymer comprising a salt of poly-γ-glutamic acid, wherein
    a weight-average molecular weight of the polymer in terms of a PEG equivalent is 50,000 to 9,000,000, and
    a degree of neutralization of the carboxyl group in the polymer is 50% or more.

2. The electrode composition according to claim 1, further comprising water.

3. The electrode composition according to claim 1, wherein a metal ion in the salt of poly-γ-glutamic acid is an alkali metal ion or an alkaline earth metal ion.

4. The electrode composition according to claim 3, wherein the metal ion is an alkali metal ion.

5. The electrode composition according to claim 3, wherein the metal ion is a Li ion or a Na ion.

6. The electrode composition according to claim 1, wherein a part of the carboxyl group is esterified.

7. The electrode composition according to claim 1, wherein the polymer is an atactic polymer in which L-form glutamic acid and D-form glutamic acid coexist.

8. The electrode composition according to claim 1, wherein the oxide is a lithium complex oxide.

9. A separator for a lithium-ion battery, comprising a binder, wherein the binder comprises:
    a polymer comprising a salt of poly-γ-glutamic acid, wherein
    a weight-average molecular weight of the polymer in terms of a PEG equivalent is 50,000 to 9,000,000, and
    a degree of neutralization of the carboxyl group in the polymer is 50% or more.

10. An electrochemical element, comprising a binder, wherein the binder comprises:
    a polymer comprising a salt of poly-γ-glutamic acid, wherein
    a weight-average molecular weight of the polymer in terms of a PEG equivalent is 50,000 to 9,000,000, and
    a degree of neutralization of the carboxyl group in the polymer is 50% or more.

11. The electrochemical element according to claim 10, which is a lithium-ion battery or an electric double-layer capacitor.

12. A lithium-ion battery negative electrode composition comprising the electrode composition according to claim 1 and the oxide is a negative electrode active material.

13. A lithium-ion battery positive electrode composition, comprising the electrode composition according to claim 1 and the oxide is a positive electrode active material.

14. The lithium-ion battery positive electrode composition according to claim 13, wherein the oxide is a lithium complex oxide.

* * * * *